United States Patent Office 3,145,738
Patented Aug. 25, 1964

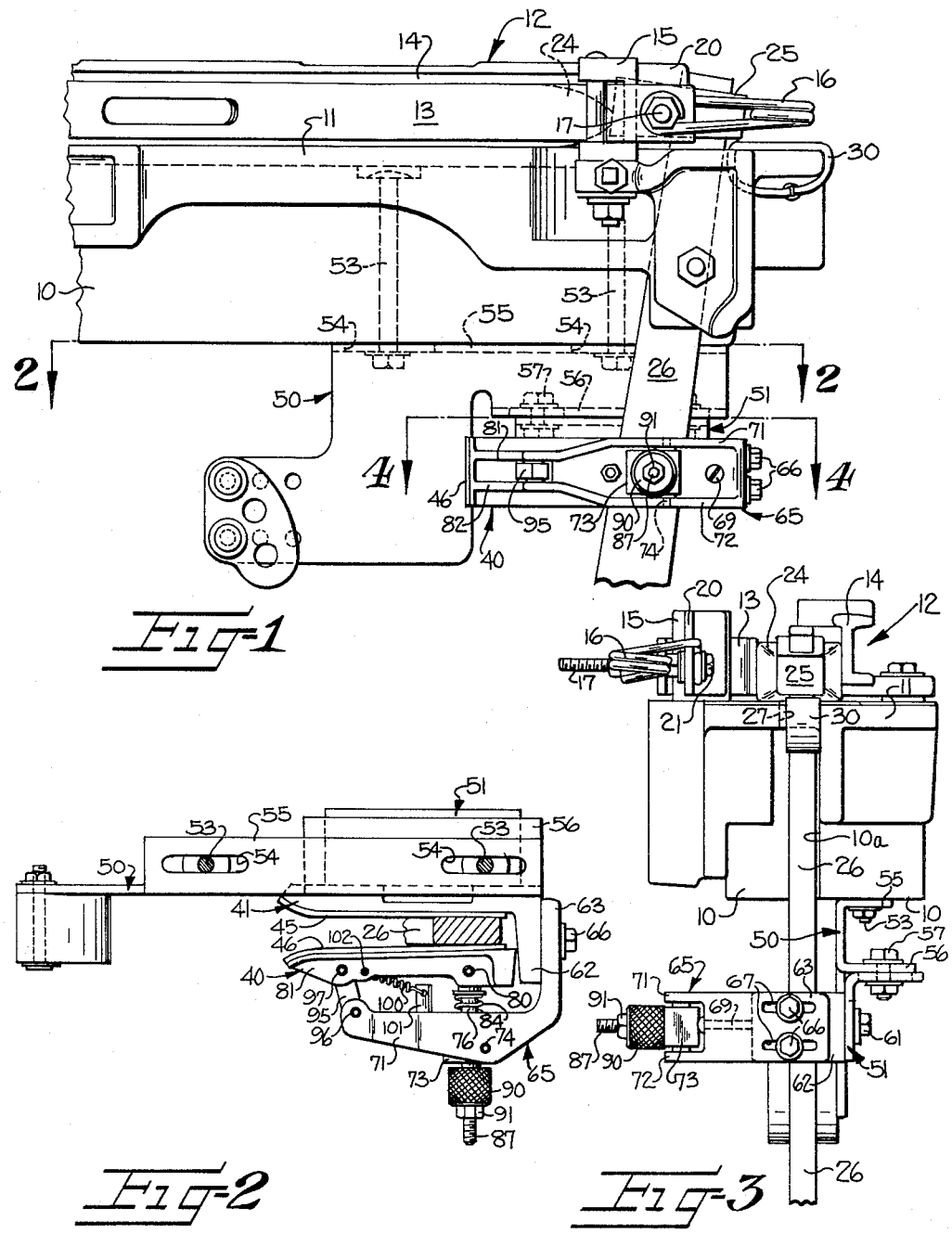

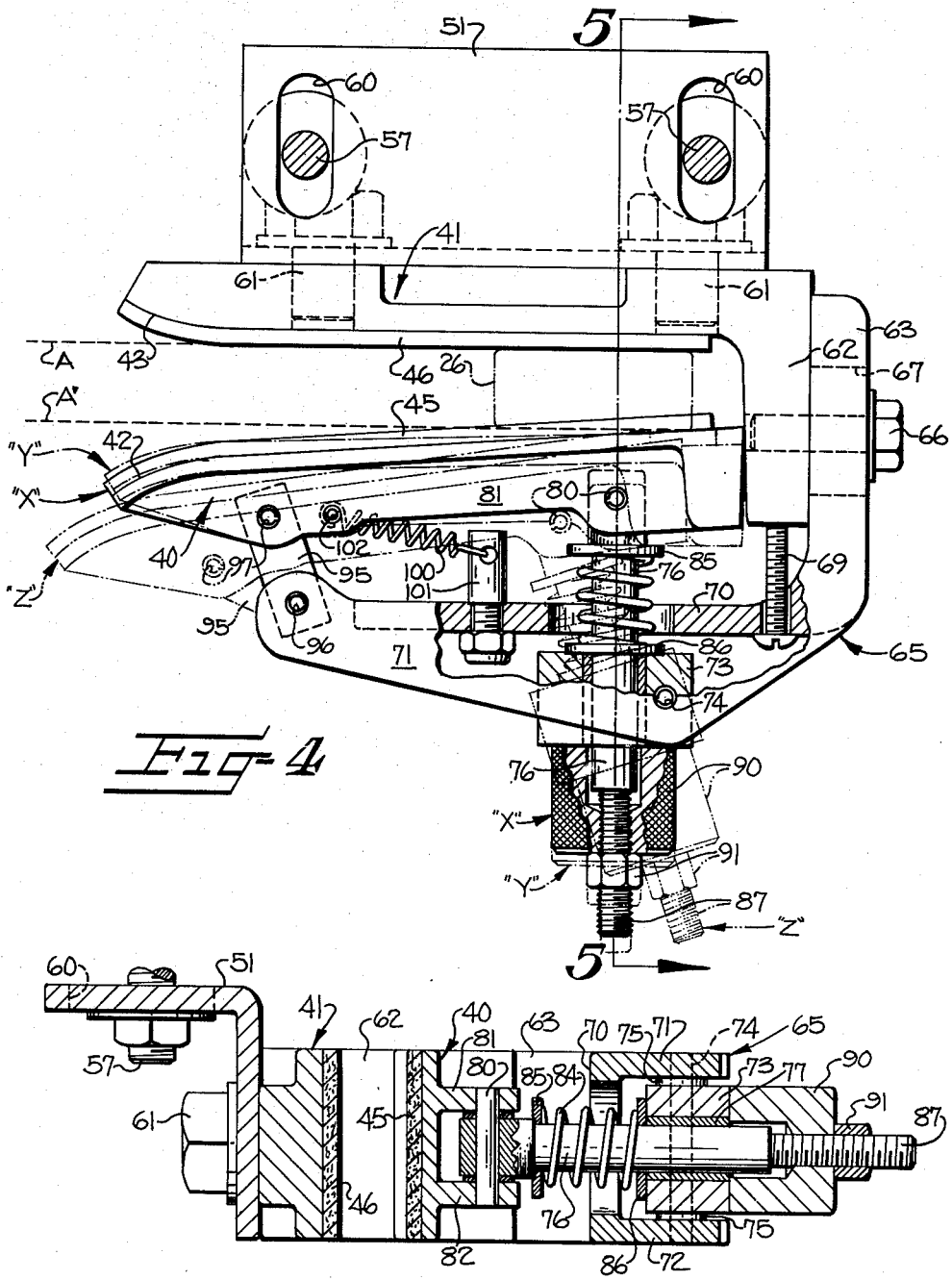

3,145,738
LOOM PICKER STICK CHECK
John G. Williamson, Jr., and Edwin C. Shaw, Charlotte, N.C., assignors to Perfecting Service Company, Charlotte, N.C., a corporation of North Carolina
Filed Sept. 5, 1962, Ser. No. 221,465
10 Claims. (Cl. 139—169)

This invention relates to looms and, more especially to an improved apparatus for arresting the shuttle as it enters each shuttle box by the action of a check on the picker stick.

As is well known, most looms include an oscillatable lay having one or more shuttle boxes on each end thereof for receiving a shuttle or shuttles which are thrown across the lay and into the shuttle boxes by a picker secured on the upper end of a picker stick which is suitably actuated by a picking mechanism to impart picking and return motions, in the form of active and inactive strokes, to the picker. The picking mechanism imparts positive movement to the picker stick in effecting each active stroke thereof while each inactive stroke of the picker stick is largely effected by the movement of the shuttle into the corresponding shuttle box against the picker.

In order to retain the shuttle or shuttles in the shuttle boxes while the shuttles are at rest, it has long been customary to provide one or more yieldable friction faces on each shuttle box which frictionally engage the shuttle positioned therein. Also, mechanism for checking or arresting the movement of the picker stick to terminate the active and inactive strokes thereof is provided, generally in the form of a check strap encircling the picker stick and carried by the loom lay so as to limit the travel or extent of stroke of the picker stick, with suitable friction fingers being provided for cushioning the movement of the picker stick as it approaches the end of each stroke thereof.

In some instances, the usual check straps of the character described have been replaced by or assisted by other types of shuttle checking or picker stick checking devices in attempts to more efficiently absorb the kinetic energy of the rapidly moving shuttle as it enters the shuttle box and in attempts to prevent rebounding of the shuttle and the picker stick upon movement of the shuttle being arrested in fully boxed position.

Many of the shuttle checking or picker stick checking devices heretofore proposed have been too expensive to manufacture and maintain to be practical, others have been cumbersome and/or difficult to adjust or have been otherwise incapable of satisfactorily performing the required checking action. More importantly, any of the checking devices proposed heretofore which have included means for gripping the picker stick in such a manner as to substantially prevent rebounding of the shuttle have provided considerable resistance to the picking mechanism, which applies a force to the picker stick intermediate its ends, with the result that considerable energy has been absorbed by the prior checking devices in order to move the picker stick out of engagement therewith. This would place the picker stick under considerable stress and would frequently result in fatigue and ultimate breakage of the picker stick. Also, the effectiveness of the forces transmitted to the picker stick would frequently be impaired by the checking device to such extent that the shuttle would fail to complete its flight across the lay and into the shuttle box at the other end thereof, notwithstanding the fact that the opposing forces transmitted back to the picking mechanism by the checking device has placed the various parts of the picking mechanism, such as the usual lug strap, pick ball and pick cam, under undue stress such as to cause the same to become worn and out of adjustment much more rapidly than they would in the absence of the prior art types of checking devices.

In order to overcome the defects of prior art picker stick checking and shuttle checking devices of the character heretofore described, it is an important object of this invention to provide an improved apparatus for arresting or checking the outward movement of the picker stick, picker and shuttle, with the picker stick in a rest position at the end of each inactive or outward stroke thereof and with the shuttle properly boxed while preventing or minimizing the tendency of the shuttle to rebound, and wherein the picker stick is instantly released from the apparatus upon initiation of each active inward stroke of the picker stick.

It is another object of this invention to provide a checking apparatus comprising a pair of spaced substantially parallel jaws, at least one of which is yieldably biased toward the other for yieldably receiving and engaging the picker stick between the jaws as it approaches and moves to the end of each inactive stroke, and wherein at least one of the jaws is, at least in part, moved outwardly away from the other jaw by movement of the picker stick in engagement therewith upon initation of each active stroke of the picker stick, thus releasing the picker stick from frictional engagement with the jaws, even while the picker stick is still between said jaws, to permit freedom of movement of said picker stick throughout the active stroke thereof.

In a preferred embodiment of the invention the picker stick check comprises a pair of elongate relatively adjustable jaws having friction liners on their proximal faces, and being adapted to be suspended from and spaced beneath a corresponding end of the loom lay. One of the jaws is preferably fixed with a substantial length of its liner extending in substantial alinement with the normal path of travel of the corresponding surface of the picker stick. The other jaw is movable and preferably normally extends at a shallow angle relative to said one of the jaws, with its outer portion, remote from the center of the lay, being yieldably biased to a position spaced from but being somewhat closer to the fixed jaw than the thickness of the picker stick. The inner end of the movable jaw is spaced outwardly or forwardly of the normal path of travel of the picker stick in the absence of a picker stick in engagement therewith and is also supported for movement in a generally angular or arcuate path such that impact of the picker stick with the liners of the jaws not only forces the outer end of the movable jaw away from the fixed jaw, but also causes the inner end of the movable jaw to move toward the fixed jaw to firmly but yieldably grip the picker stick between the jaws. Thus, upon subsequent initiation of an inward or active stroke of the picker stick, the picker stick momentarily moves the movable jaw therewith so the inner end of the movable jaw moves along said generally angular or arcuate path and diverges relative to the fixed jaw to release the picker stick so as to avoid placing the picker stick under undue stress and so that the picker stick and the shuttle are fully subjected to the forces acting thereupon to impart each active stroke thereto without being encumbered by the picker stick check.

Some of the objects of the invention having been stated, other objects will appear as the description proceeds when taken in connection with the accompanying drawings, in which:

FIGURE 1 is a front elevation of a shuttle box, picker stick and picker at the right-hand end of the lay of a loom showing a preferred embodiment of the improved picker stick checking apparatus of the present invention in association therewith;

FIGURE 2 is a plan view of the improved picker stick checking apparatus taken substantially along line 2—2 in FIGURE 1 and showing the picker stick in cross-section occupying its outermost or rest position in which it is yieldably gripped or clamped between the jaws of the apparatus;

FIGURE 3 is an outer end elevation looking at the right-hand side of FIGURE 1;

FIGURE 4 is an enlarged plan view, partially broken away and in section, taken substantially along line 4—4 in FIGURE 1, but showing, in solid lines, the position normally occupied by the movable jaw when the picker stick has been moved inwardly toward the center of the loom and away from the checking apparatus, and showing, in dash-dot lines, two other extreme positions to which the movable jaw is moved by the picker stick;

FIGURE 5 is a vertical sectional view taken substantially along line 5—5 in FIGURE 4.

Referring more specifically to the drawings, and to FIGURES 1 and 3 in particular, the preferred embodiment of the invention is shown in association with the right-hand end portion of the lay 10 of a loom upon which is mounted the usual lay end or lay cap 11 forming the bottom of a shuttle box 12. Shuttle box 12 includes the usual front and rear face plates, either of which may be in the form of a binder. In this instance, the front face plate 13 serves as the binder, only a portion of which is shown in FIGURE 1, and whose outer end is movably supported in a substantially C-shaped bracket 15.

Binder 13 is normally yieldably urged rearwardly toward back face plate 14, as by a torsion spring 16, one end of which is connected to a bolt 17 bearing against a portion of the outer end of binder 13, and the other end of which is connected to a flange 20 projecting outwardly from C-shaped bracket 15, as by a bolt 21. Bolt 21 extends through flange 20 and engages the rear surface of the outer end of binder 13 at a point spaced outwardly from the point at which the front surface of binder 13 is engaged by bolt 17 so that the inner end of binder 13, remote from bracket 15, is yieldably biased rearwardly by spring 16, as is well known.

A conventional shuttle 24 is shown positioned in shuttle box 12 between binder 13 and back face plate 14 with one end of the shuttle 24 being in engagement with a conventional picker 25 fixed on the upper end of a picker stick 26 extending through the usual longitudinally extending slot 27 formed in the lay end or lay cap 11. Although the lay usually has a slot therethrough to accommodate the picker stick 26, the particular shuttle box shown in FIGURE 12 is of the type adapted to be associated with the usual automatic bobbin replenishing or transfer mechanism and, therefore, the front portion of lay 10 is shown as being recessed, as at 10a (FIGURE 3), to permit expellation of an empty bobbin from shuttle 24 during the usual bobbin transfer operation. Of course, picker stick 26 is freely movable in the recess 10a.

The lay cap 11 is usually provided with a leather loop 30 at its outer end and which extends through slot 27 for receiving the impact of the picker stick thereagainst in the event the picker stick is moved outwardly beyond its normal rest position. It will be observed in FIGURE 1 that picker stick 26 is disposed in close proximity to leather loop 30 when shuttle 24 is properly boxed. The picker stick is actuated by means of a conventional picking mechanism which is not shown since it is well known in the art and a description and illustration is thus deemed unnecessary.

As is well known, the picking mechanism imparts an active inward stroke to picker stick 26 and picker 25 to expel shuttle 24 from shuttle box 12 and throw the same across the lay into a shuttle box at the other end of the lay with alternate picks of the loom, and the shuttle 24 is thrown back across the lay from the other end thereof with intervening picks of the loom, in the course of which the shuttle 24 engages picker 25 and imparts outward movement thereto along with picker stick 26.

The picker stick checking apparatus of the present invention is particularly devised for absorbing the kinetic energy of the rapidly moving shuttle as it enters shuttle box 12 to stop the picker stick 26 and picker 25 with the shuttle properly boxed while so gripping the picker stick as to prevent the same from rebounding, thereby minimizing the tendency for the shuttle to rebound at the end of its movement into the shuttle box. Further, the improved picker stick checking apparatus is so devised as to readily release the picker stick immediately upon an inward force being applied thereto, such as by actuation of the picking mechanism.

The improved picker stick checking apparatus comprises a pair of spaced generally parallel elongate first and second jaws 40, 41 carried by a suitable frame to be presently described. The first jaw 40 is spaced laterally or forwardly of the second jaw 41. In this instance, the rear jaw 41 is fixed with respect to lay 10, although it is so mounted as to be adjusted forwardly and rearwardly as well as inwardly and outwardly so that it may occupy optimum position with respect to the lay 10 and picker stick 26 to effect the most efficient checking action.

The terms "inwardly," "outwardly," "forwardly" and "rearwardly" are generally used in the specification and claims to orient various parts of the picker stick checking apparatus with respect to the lay 10. Also, the term "laterally" is generally used to identify a position transverse of the longitudinal axis of lay 10; i.e., forwardly and rearwardly.

The front jaw 40 is laterally movable, toward and away from fixed jaw 41, as well as in a somewhat angular or curvilinear angular path with respect to the normal path of travel of picker stick 26. The position normally occupied by movable jaw 40, in the absence of the picker stick 26 between jaws 40, 41 is shown in solid lines in FIGURE 4, such normal position being indicated at "X" in FIGURE 4. This normal position "X" is also adjustable relative to fixed jaw 41. The free inner ends of jaws 40, 41 are curved in opposite diverging relation to each other, as at 42, 43, so as to readily receive the outwardly moving picker stick 26 therebetween.

The proximal surfaces of jaws 40, 41, including the curved free end portions 42, 43 thereof, are provided with friction liners 45, 46 adhesively or otherwise suitably secured thereto and extending throughout substantially the entire length thereof. It is apparent that the outer ends of liners 45, 46 should terminate outwardly of the extreme outward position which may be occupied by picker stick 26, although it is preferable that the outer end of liner 45 terminates short of the outermost end of the movable jaw 40. The liners 45, 46 may be made from any suitable friction material, such as bonded fibers, synthetic rubber, leather or the like.

Liner 46 of fixed jaw 41 should be positioned parallel to, or very nearly parallel to, the normal path of travel of picker stick 26 and in substantial alinement therewith so that picker stick 26 may move in very close proximity to the front surface of liner 46 during a substantial portion of each active and inactive stroke thereof and so the picker 25 may remain in proper alinement with shuttle 24 when the picker stick is yieldably engaged by the liner 45 on movable jaw 40. Thus, the fixed jaw 41 is suspended from the lay 10 by means of a frame including a pair of relatively adjustable primary and secondary check supporting brackets 50, 51. The primary bracket 50 is secured to the lower surface of lay 10 for longitudinal adjustment relative to lay 10 by means of a pair of longitudinally spaced bolts 53 which extend through respective longitudinally extending slots 54 provided in a rearwardly projecting flange 55 on the upper end of bracket 50. The lower outer portion of bracket 50 also has a rearwardly projecting flange 56 thereon to which the flanged upper portion of secondary angle bracket 51 is secured for forward and rearward adjustment relative to bracket 50 and lay 10, as by bolts 57 which extend through a pair of longitudinally spaced, forwardly and rearwardly extending adjustment slots 60 (FIGURE 4) in the flanged upper portion of secondary bracket 51.

The fixed jaw 41 may be suitably secured to or formed integral with the secondary bracket 51. In this instance, the rear surface of fixed jaw 41 is fixed to the front surface of secondary bracket 51 by screws 61. The fixed jaw 41 has a laterally projecting heel portion or arm 62 thereon which extends forwardly from the outer end of jaw 41 and is preferably formed integral therewith. A laterally projecting arm 63 of a movable jaw support, broadly designated at 65, is adjustably secured to the outer surface of heel portion 62, as by means of a pair of screws 66 extending through corresponding laterally extending slots 67, thus providing for forward and rearward adjustment of support 65 and the movable jaw 40 carried thereby relative to fixed jaw 41.

The movable jaw support 65 has a longitudinal guide arm 70 integral with, extending in substantially right-angular relation to arm 63 and which also extends substantially parallel to fixed jaw 41. Guide arm 70 is loosely penetrated by a screw 69 threaded into the front end of arm 62 of jaw 41 to assist screws 66 in maintaining support 65 in adjusted position.

Guide arm 70 has a pair of vertically spaced flanges or web portions 71, 72 thereon, a portion of upper flange 71 being broken away in FIGURE 4. A guide block 73 is journaled on a pin 74 extending between and fixed in medial portions of the flanges 71, 72. Suitable washers 75 may be provided between the proximal surfaces of flanges 71, 72 and guide block 73. Guide block 73 is slidably penetrated by a presser rod 76, there preferably being a sleeve 77 fixed in guide block 73 to serve as a bearing surface between guide block 73 and presser rod 76.

Presser rod 76 normally extends at a substantially right-angle to the normal path of travel of picker stick 26 and is spaced inwardly from and disposed relatively closely adjacent to the outer end of movable jaw 40. Presser rod 76 is pivotally connected to jaw 40 by means of a pivot pin 80 extending through a pair of spaced flanges 81, 82 integral with movable jaw 40 and between which the rear end portion of presser rod 76 is journaled on the pivot pin 80. It can thus be seen that presser rod 76 serves as a telescoping link pivotally interconnecting guide arm 70 and movable jaw 40.

The presser rod 76 and, thus the movable jaw 41, are normally urged rearwardly toward fixed jaw 41 by a compression spring 84, the rear end of which bears against a washer 85 and the front end of which bears against the block 73 through the medium of a washer 86. Washer 85 seats against a shoulder formed on the presser rod 76, although it is apparent that spring 84 or the washer 86 may bear against the jaw 40 or its flanges 81, 82.

In order to adjustably limit the extent to which the movable jaw 40 may be moved rearwardly at its outer portion in the absence of a picker stick being positioned between the jaws 40, 41, the front end of presser rod 76 has a threaded stem 87 integral therewith which is engaged by a relatively large nut 90 which is adapted to bear against the front surfaces of guide block 73 to limit the extent of rearward movement of jaw 40 relative to jaw 41. A lock nut 91 may also be mounted on stem 87 in engagement with the front end of nut 90. The outer surface of nut 90 is preferably knurled so that it may be finely adjusted by hand, if desired.

Means are provided, in addition to presser rod 76, for normally maintaining the rear surface of movable jaw 40 in an angular position such that the free or inner end thereof is normally spaced substantially forwardly of the normal path of travel of picker stick 26 while the outer end portion thereof or, at least, the outer end portion of its liner 45, is disposed laterally inwardly of the normal path of travel of the corresponding front surface of picker stick 26 in the absence of picker stick 26 being positioned between jaws 40, 41. Further the latter means serves to swing rearwardly the free inner end of jaw 40 upon impact of picker stick 26 with liner 45 and with the consequent lateral, forward, movement of jaw 40 effected by movement of picker stick 26 to checked rest position. Thus, jaw 40 then occupies a picker stick gripping or clamping position shown in dash-dot lines indicated at "Y" in FIGURE 4, in which the jaw 40 is disposed in a parallel position, or very nearly so, with respect to jaw 41. Also, the latter means serves to guide the movable jaw 40 in a diverging angular or curvilinear, path away from fixed jaw 41 and toward the center of the loom upon initiation of each active, inward, stroke of picker stick 26 in engagement with liner 45 and during which the jaw 40 is moved to a picker stick releasing position shown in dash and double-dot lines indicated at "Z" in FIGURE 4. Thus, the picker stick is readily released from frictional engagement with jaw 40 well before it has passed inwardly beyond the free inner ends of jaws 40, 41.

To this end, a link 95 interconnects the free inner end portion of jaw 40 and the corresponding inner end portion of guide arm 70 of movable jaw support 65. The rear end of link 95 is positioned between flanges 81, 82, of jaw 40 at a point spaced outwardly of, but disposed in relatively close proximity to, the free inner end of jaw 40. Link 95 is pivotally mounted on a pivot pin 96 fixed in and extending between flanges 81, 82.

The front end of link 95 is pivotally mounted on a pivot pin 97 which extends between flanges 71, 72 and opposed ends of pivot pin 97 are fixed in flanges 71, 72. The inner end portion of guide arm 70 is recessed or terminates short of the inward ends of flanges 71, 72 to accommodate link 95.

Jaw 41 is normally urged outwardly, so that its outer end normally bears against the inner surface of heel portion 62 of jaw 41, by a tension spring 100, the outer end of which is connected to a spring anchor 101 projecting rearwardly from and being suitably secured to guide arm 70 of support 65. The other, inner, end of tension spring 100 is connected to the flanges 81, 82, of jaw 40, as at 102.

The path of travel of picker stick 26 is represented by a pair of spaced broken lines A, A' in FIGURE 4, the broken line A representing the path of travel of the rear surface of picker stick 26 and the broken line A' representing the path of travel of the front surface of picker stick 26. It will be observed that broken line A is alined substantially with the face of friction liner 46 on fixed jaw 41 while broken line A' intersects the face of the friction liner 45 of movable jaw 40 at a point between the lateral planes of pivot pins 80, 96 with respect to broken lines A, A'. In practice, it has been found desirable to so position the movable jaw support 65 and the presser rod 76 relative to each other and relative to fixed jaw 41 that the path of travel of the front surface of picker stick 26, represented by broken line A', will intersect the face of liner 45 at a point approximately halfway between the lateral planes of pivot pins 80, 96, with the relationship of the pivot pins 80, 96 and jaw 40 being such that the inner ends of the flat portions of liners 45, 46 will be spaced apart a distance of from .005 to .035 inch, approximately, greater than the thickness of the picker stick 26 when the picker stick occupies rest position and jaw 40 occupies position "Y" of FIGURE 4, in which picker stick 26 is gripped between the liners 45, 46 of jaws 40, 41, as shown in FIGURE 2. Actually, the best normal position "X" to be occupied by jaw 40 relative to jaw 41 can best be determined empirically. Since the jaw 40, has pivotal movement about the axes of both the pivot pins 80, 96, it is desirable that the proximal surfaces of jaw 40 and heel 62 of jaw 41 extend in relative angular relationship as shown in FIGURES 2 and 4.

In operation, as picker stick 26 enters the checking apparatus with an outward stroke thereof and during the boxing of shuttle 24, the front surface of picker stick 26 initially engages a medial portion of liner 45 and then forces forwardly the outer portion of jaw 40 against the pressure of spring 84. This causes the outer end of jaw 40 to pivot about the axes of both pivot pins 80, 96 and come to rest in position "Y" of FIGURE 4, with the proximal surfaces of liners 45, 46 in very nearly parallel relationship, as heretofore stated. The position "Y" of movable jaw 40 is effected because of the substantially straight forward movement of the outer end of presser rod 76 and the movement of jaw 40 about the axis of pin 96. It follows that, during the course of outward movement of picker stick 26 toward abutment 62 and in engagement with the liners of jaws 40, 41, the yieldable gripping force applied to the picker stick is rapidly increased until the picker stick reaches rest position and at which time the picker stick is then firmly, but yieldably, gripped between liners 45, 46 of jaws 40, 41.

Upon the next succeeding active, inward stroke being imparted to picker stick 26, the frictional engagement of picker stick 26 with liner 45 of jaw 40 immediately causes jaw 40 to move inwardly a relatively short distance with the picker stick 26 and away from the inner surface of heel portion 62 of fixed jaw 41. In so doing, link 95 is moved inwardly at its rear end and pivots about pivot pin 97, thus moving the inner end of jaw 40 forwardly in diverging relation to jaw 41 to position "Z" of FIGURE 4. This diverging movement of the inner end of movable jaw 40 is also rapidly increased as the picker stick moves away from the right-hand end portion of liner 46 in FIGURES 2 and 4, because of the short distance between pivot pins 96, 97. It should be noted that the angular movement of the free inner end of jaw 40 is much greater than that of the outer end of jaw 40, because of the greater distance between pivot pins 74, 80 as compared to the distance between pivot pins 96, 97 and, also, because of the rearward movement of the outer end of jaw 40 caused by spring 84 as picker stick 26 moves inwardly. Thus the free inner end portion of movable jaw 40 moves inwardly and forwardly in a curvilinear path to release the picker stick from being grippingly engaged by liners 45, 46 of jaws 40, 41 at very nearly the instant at which an active stroke of picker stick 26 is initiated, so that picker stick 26, while being firmly gripped at the end of each outward stroke thereof, is free to move, without being encumbered by the picker stick check, upon only a very small extent of active movement subsequently being imparted to picker stick 26. In fact, the front outer edge of picker stick 26 moves out of frictional contact with liner 45 well before it reaches the point on liner 45 which was initially engaged by picker stick 26 in the course of its preceding ingress into the checking apparatus, even though the liner 45 does follow the picker stick for a short interval thereafter due to rearward movement of liner 45 back to position "X".

It should also be noted that liner 45 applies practically no frictional resistance to active movement of picker stick 26 from the instant that such active movement is initiated, because the jaw 40 and picker stick 26 move inwardly together, unitarily, until the front outer edge of picker stick 26 moves out of frictional contact with liner 45. It is apparent that this results in smooth uninterrupted active movement being imparted to the picker stick and avoids placing the picker stick and the usual picking mechanism under the stresses to which the picker stick would normally be subjected by picker stick checking devices heretofore in use.

As a convenience in the installation of the picker stick checking apparatus of the present invention, the inner portion of primary bracket 50 has an extension 50a thereon which is disposed inwardly of secondary bracket 51 and has a yieldable bumper 105 fixed thereon, preferably by means of a pair of bolts 106 which may be positioned in any one of three sets of holes 107 provided in extension 50a of primary bracket 50. It is apparent that bumper 105 is positioned inwardly of the picker stick check such a distance as to receive and absorb the impact of picker stick 26 in the course of inward active movement thereof while limiting such inward active movement. The bumper 105 may be made from rubber, synthetic rubber, plastic or the like.

It is thus seen that there is provided an improved picker stick check which serves to firmly grip the picker stick at the end of each outward stroke thereof so as to prevent rebounding of the picker stick and the shuttle upon the shuttle being fully boxed, and which will also release the picker stick at substantially the instant that an active stroke thereof is initiated so that very little, if any, of the force imparted to the picker stick by the picking mechanism is lost through overcoming the pressure of the picker stick check on the picker stick.

In the drawings and specification there has been set forth a preferred embodiment of the invention and, although specific terms are employed, they are used in a generic and descriptive sense only and not for purposes of limitation, the scope of the invention being defined in the claims.

We claim:

1. A checking apparatus for checking a picker stick in a rest position relative to the lay of a loom and wherein said picker stick moves inwardly from the rest position to an active position in propelling a shuttle across said lay, said apparatus comprising (a) a pair of spaced substantially parallel elongate first and second jaws adapted to be mounted on the lay and adapted to receive said picker stick therebetween, (b) means yieldably urging at least one of said jaws toward the other such as to yieldably grip the picker stick in rest position therebetween upon impact of the picker stick with said jaws, (c) means limiting relative movement of said jaws toward each other such as to maintain said jaws in spaced relationship in the absence of a picker stick therebetween, and (d) means responsive to inward active movement of the picker stick for moving at least the first jaw to an angular position with respect to the path of travel of the picker stick and in the course of which movement the inner end of the first jaw is moving away from said path while a portion of the first jaw adjacent its outer end remains and moves in engagement with the picker stick to thereby relieve the grip of the jaws on said picker stick upon initiation of each inward active movement of said picker stick.

2. A picker stick check for use on either end of the lay of a loom for arresting a picker stick at the end of each outward inactive stroke thereof comprising (a) a pair of horizontally spaced substantially parallel elongate first and second jaws adapted to be mounted on one end of the lay and adapted to receive the picker stick therebetween, (b) means yieldably urging at least one of said jaws toward the other such as to yieldably engage opposed sides of the picker stick upon impact of the picker stick with said jaws in the course of an inactive stroke of the picker stick, (c) means limiting movement of said one of the jaws toward the other such as to maintain said jaws in spaced relationship in the absence of a picker stick therebetween, and (d) means supporting at least the first jaw for movement in a diverging path away from the second jaw and toward the direction of an active stroke of the picker stick, said path being such that the inner end of the first jaw moves away from the second jaw while a portion of the first jaw adjacent its outer end remains in engagement with the picker stick and such that relative separating movement is effected between said jaws when the picker stick initially moves in engagement with said first jaw in an active stroke of the picker stick to free the picker stick for movement from between said jaws.

3. A structure according to claim 2, including means for moving said first jaw a predetermined distance in a direction opposite from the direction of an active stroke of the picker stick upon movement of said movable jaw out of engagement with the picker stick moving in an active stroke to ready the first jaw for succeeding successive inactive and active strokes of the picker stick.

4. A picker stick checking apparatus for the lay of a loom comprising (a) a frame adapted to be mounted on the lay,
(b) a fixed jaw connected to said frame,
(c) a movable jaw extending in spaced substantially parallel relation to said fixed jaw,
(d) each of said jaws having an inner end and an outer end,
(e) a jaw support fixed with respect to said fixed jaw and having a portion spaced laterally from said movable jaw and remote from said fixed jaw,
(f) a pair of inner and outer longitudinally spaced links each having spaced pivot points and pivotally connecting the respective inner and outer ends of said movable jaw to said portion of said support,
(g) means yieldably urging the outer end of said movable jaw toward said fixed jaw,
(h) means limiting the extent to which said movable jaw may move toward said fixed jaw and preventing said movable jaw from engaging said fixed jaw, and
(i) the distance between the pivot points of said inner link being substantially less than the distance between the pivot points of said outer link, and the links being positioned so that the inner end of the movable jaw moves further away from the fixed jaw than the outer end of the movable jaw when it is moved inwardly generally parallel to said fixed jaw.

5. A structure according to claim 4, including means for adjusting said jaw support (e) toward and away from said fixed jaw to adjustably vary the position of said movable jaw relative to said fixed jaw.

6. In a picker stick check for looms having a pair of laterally spaced jaws each having an outer end adapted to be mounted adjacent one outer end of a loom lay and also having an inner end; the combination of (a) a support for said jaws,
(b) means connecting the inner end of one of said jaws to said support for movement in a generally arcuate path toward and away from the other jaw,
(c) means yieldably urging the outer end of said one jaw toward the other jaw,
(d) means limiting lateral movement of said one jaw toward the other jaw,
(e) means limiting outward movement of said one jaw with respect to the corresponding outer end of the lay,
(f) the relative positions of both of said limiting means and said connecting means being such as to normally maintain said one jaw at an angle diverging away from the other jaw and toward the inner end of said one jaw in the absence of a picker stick between said jaws and serving to cause the inner end of said one jaw to move laterally toward said other jaw upon inactive outward movement of the picker stick into engagement therewith and into the space between said jaws whereby said jaws are in more parallel relationship when said picker stick is engaged between the outer ends of said jaws than in the absence of the picker stick therebetween, and (g) the arcuate path of said connecting means being such that, upon active inward movement of the picker stick, the initial movement of the picker stick in frictional engagement with said one jaw moves said one jaw inwardly therewith and the inner end of said one jaw moves away from the path of travel of the picker stick.

7. A picker stick checking apparatus for the lay of a loom comprising (a) a frame adapted to be mounted on the lay,
(b) a fixed jaw connected to said frame,
(c) a movable jaw extending in spaced substantially parallel relation to said fixed jaw,
(d) each of said jaws having an inner end and an outer end,
(e) a jaw support fixed with respect to said fixed jaw and having a portion spaced laterally from said movable jaw and remote from said fixed jaw,
(f) a pair of longitudinally spaced links pivotally connecting the inner and outer ends of said movable jaw to said portion of said support, the link connecting the outer end of said movable jaw to said jaw support comprising
  (1) a rod,
  (2) means pivotally connecting one end of said rod to the outer end of said movable jaw, and
  (3) a guide block pivotally mounted on said jaw support and in which a portion of said rod remote from said fixed jaw and spaced from said movable jaw is guided for axial movement toward and away from said fixed jaw,
(g) means yieldably urging the outer end of said movable jaw toward said fixed jaw, and
(h) means limiting the extent to which said movable jaw may move toward said fixed jaw and preventing said movable jaw from engaging said fixed jaw whereby the outer end of said movable jaw may move laterally toward and away from said fixed jaw and in a generally longitudinal arcuate path.

8. A structure according to claim 7, in which the distance between the pivot points of the link connecting the inner end of said movable jaw to said jaw support is substantially less than the distance between the point at which said rod is pivotally connected to said movable jaw and the point at which said guide block is pivotally mounted on said jaw support.

9. A structure according to claim 7, in which the means (g) yieldably urging said movable jaw toward said fixed jaw comprises a coiled compression spring encircling said rod between said movable jaw and said guide block, and the limiting means (h) comprises a nut threaded onto the end of said rod remote from said movable jaw and engageable with the end of said guide block remote from said movable jaw.

10. A picker stick checking apparatus for the lay of a loom comprising (a) a frame adapted to be mounted on the lay,
(b) a fixed jaw connected to said frame,
(c) a movable jaw extending in spaced substantially parallel relation to said fixed jaw,
(d) each of said jaws having an inner end and an outer end,
(e) a jaw support fixed with respect to said fixed jaw and having a portion spaced laterally from said movable jaw and remote from said fixed jaw,
(f) a pair of longitudinally spaced links pivotally connecting the inner and outer ends of said movable jaw to said portion of said support, (g) means yieldably urging the outer end of said movable jaw toward said fixed jaw, (h) means limiting the extent to which said movable jaw may move toward said fixed jaw and preventing said movable jaw from engaging said fixed jaw, (i) means yieldably urging said movable jaw outwardly toward the lateral plane of the outer end of said fixed jaw, and (j) means limiting the extent to which said movable jaw may move outwardly to where said jaws are normally positioned in opposed substantially laterally alined relationship.

References Cited in the file of this patent

UNITED STATES PATENTS

| | | |
|---|---|---|
| 1,421,172 | Clayton | June 27, 1922 |
| 2,431,584 | Pratt | Nov. 25, 1947 |
| 2,447,761 | Macro | Aug. 24, 1948 |